July 17, 1934.  W. WEIS  1,967,167
FLUID COMPRESSION APPARATUS
Filed Feb. 27, 1933
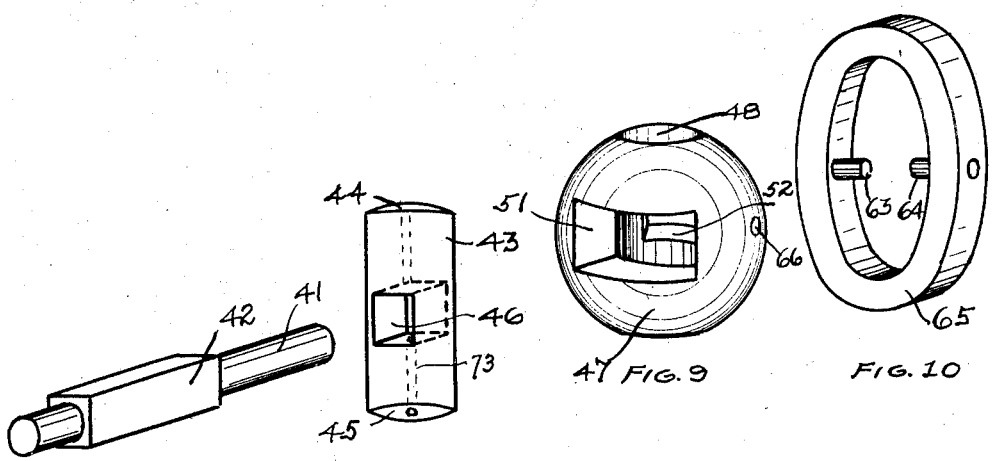
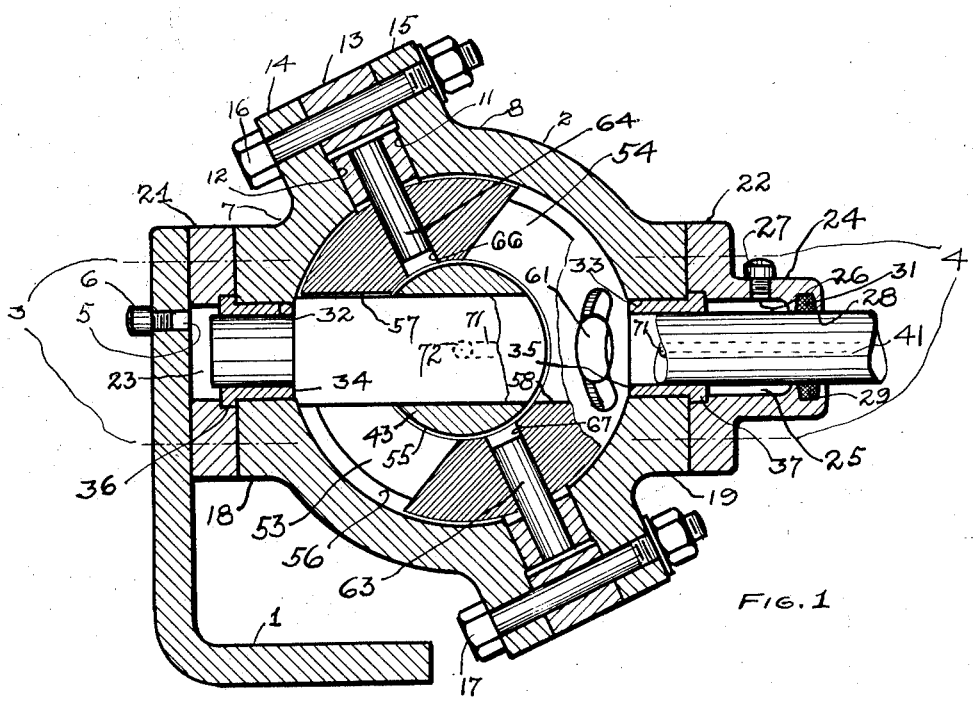
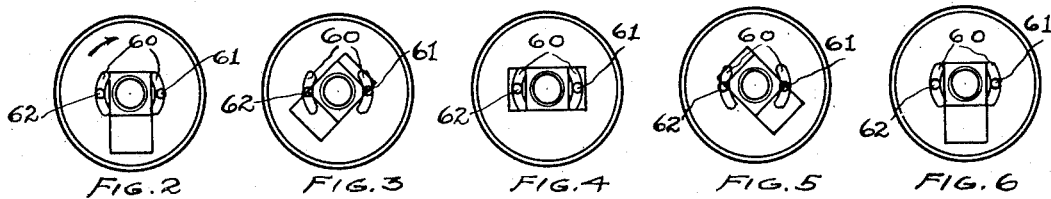
WILLIAM WEIS, INVENTOR,
BY Saywell & Wesseler,
ATTORNEYS.

Patented July 17, 1934

1,967,167

UNITED STATES PATENT OFFICE 1,967,167

FLUID COMPRESSION APPARATUS

William Weis, Cleveland, Ohio, assignor, by direct and mesne assignments, of two-thirds to Edward M. Kline, and one-third to William J. Wesseler, both of Cleveland, Ohio Application February 27, 1933, Serial No. 658,877

17 Claims. (Cl. 103—117)

This invention, as indicated, relates to a fluid compression apparatus. More particularly, it comprises a device having a casing housing rotating and oscillating members adapted to be operated to exert pressure upon fluid to produce pumping action or compression action for various purposes such as forcing liquids or gases through passageways or as a step preliminary to the expansion of gases in an explosion power stroke such as in a Diesel engine, or such rotating and oscillating members of the device may be directly actuated as elements of a power unit by fluid pressure applied to said members, or through the expansive action of steam in one or more stages.

Herefore it has been proposed to utilize the transverse movement of a member operating within a spherical housing to compress fluids for various purposes. Such devices have been applied to pumps, gas engines, and various types of fluid pressure apparatus, but in most instances, such structures have involved a multiplicity of parts, each requiring the utmost accuracy of manufacture and careful assembly to prevent leakage and to avoid undue friction.

The present invention has for its principal object the provision of an apparatus which will rotate continuously in one direction and simultaneously have an oscillating member moving to alternately open or close one or more operating chambers formed by the surfaces of said member and the surfaces of adjacent members.

Another object of the invention is to provide a mechanism of the type referred to having a minimum of parts and a high unit capacity for the work for which the apparatus is designed.

Another object of the invention is to provide an apparatus capable of being manufactured at low cost and yet able to maintain severe and long continued service without replacement.

A further object of the invention is to provide a device serving as a gas pump, such structure occupying a minimum of space and adapted for installation in various types of apparatus such as in cabinets of refrigerating devices for circulating the cooling medium therethrough.

A further object of the invention is to provide a spherical casing having a shaft supported therein for rotation, said shaft carrying a guide member at right angles thereto upon which a specially formed substantially spherical member is supported for oscillatory movement, the parts cooperating with the casing to provide a plurality of chambers to provide for the compression or expansion of gases or pumping action on liquids or the like.

A further object of the invention is to provide a means for causing oscillation of a member to produce expansion or compression movement in cooperating with adjacent members in a manner to reduce friction and vibration to a minimum and permit of very high operative speeds.

A further object of the invention is to produce a structure having four distinct and separate fluid chambers which may be enlarged and reduced in size through the rotation of the operative elements thereof by mechanical power applied thereto or through fluid pressure introduced therein.

Other and further objects of the invention will appear in the course of the following description.

To the accomplishment of the foregoing and related ends, said invention, then, consists of the means hereinafter fully described and particularly pointed out in the claims, the annexed drawing and the following description setting forth in detail certain structures embodying the invention, such disclosed means constituting, however, but one of various forms in which the principle of the invention may be used.

In said annexed drawing:

Figure 1 is a central vertical sectional view, showing the assembled structure;

Figures 2 to 6, inclusive, are diagrammatic views, illustrating the various positions of the oscillating member at various stages of a cycle of operation;

Figure 7 is a perspective view of the central operating shaft;

Figure 8 is a perspective view of the cross guide member;

Figure 9 is a perspective view of the oscillating member; and

Figure 10 is a perspective view of the annulus carrying the pins.

As will more clearly appear from Figure 1 of the drawing, the device comprises a supporting bracket 1, in the form of an angle plate with a horizontal base portion and a vertical portion serving as a support and closure for a casing 2 secured thereto by means of fastening elements of any preferred type, such as bolts or studs inserted at the point indicated by the lines marked 3. Similar bolts or studs indicated by the lines marked 4 are provided at the opposite sides of the casing for securing the enclosure thereof at such point. An oil hole 5 may be provided through the vertical portion of the bracket, such oil hole having a screw plug 6 to close the same. The casing proper comprises two halves 7, 8, of somewhat less than semi-spherical extent and substantially complementary to each other in outline, which have machined annular surfaces 11, 12, held in spaced relation with suitable running clearances by means of an annular casing member 13 interposed between the flanges 14, 15, of the respective casing halves. The flanges 14, 15, extend at an oblique angle about the assembled casing, such angle to the vertical being determined according to the speed and service of the apparatus, but for the purposes of a fluid pump, being satisfactory at a thirty degree angle, or in some instances, an angle of twenty-five degrees.

The annular casing member 13 is held in firm assembly with the casing halves by means of suitable bolts such as the bolts 16 and 17, shown in Figure 1 of the drawing, and such additional bolts as may be required about the circumference of the casing to prevent leakage, depending on the size of the apparatus and the pressures to be contended with, as well as the speed of operation of the device. The casing is formed with bosses 18, 19, at its horizontally opposite central areas against which the end plates 21 and 22 are secured by the pairs of fastening members 3 and 4, heretofore referred to.

The end plate 21 is apertured to provide an oil chamber 23 for one end of the central shaft of the apparatus, and the end member 22 is formed with an extension 24 to provide an oil chamber 25 about the shaft, said chamber having a filling opening 26 closed by a screw plug 27. The extension is provided with an opening 28 for the end of the central shaft and an under cut annular recess 29 is provided to receive a packing element 31 of some suitable compressible material. Central apertures 32, 33 are formed through the respective casing halves, and bearing sleeves 34, 35, are engaged within said apertures, respectively, said bearing members having flanges 36, 37 at their outer ends engaged within suitable recesses in the end plates to receive and clampingly hold the same in operating position.

The central shaft 41 is formed with a central portion 42 of squared cross section, and the end portions of said shaft are cylindrical to engage within the bearing sleeves 34, 35, heretofore described. A cylindrical cross guide member 43 is provided, said member having rounded end portions 44, 45 preferably conforming substantially to the contour of the spherical oscillating member when such cross guide member is assembled therewith, and having at a central point a squared aperture 46 extending therethrough to snugly engage the squared portion of the central operating shaft.

The oscillating member 47 is in the form of a sphere provided with an opening 48 therethrough to receive the cylindrical cross guide member. At right angles to the position of such central axial opening 48 a pair of openings 51, 52, are provided, such openings having arcuate parallel walls and inwardly approaching end walls. The openings are of a width to receive the squared portion of the central operating shaft between the arcuate parallel walls with slight running clearance. The angular position of the end walls of such openings is such that when the oscillating member has been moved to its extreme position of motion, one end wall of such opening will be substantially parallel to and in contact with the adjacent squared surface of the central operating shaft, while its companion end wall is at its farthest point removed from the opposite squared surface of the said shaft, the opening thus providing a chamber 53, 54, at each opposite side of the apparatus at such point, such chamber being formed of the respective arcuate parallel walls of the opening in the oscillating member and the inner wall provided by the surface 55 of the cross guide member and the adjacent surface 56 provided by the inner wall of the casing 2.

Each of the chambers 53 and 54, through movement of the oscillatory member, caused by movement of the central operating shaft through an arc of 180° or one-half a revolution, and the action of the annular pin carrying member and its pins, presently to be described, are reduced to substantially total closure with practically no cubic capacity, and the companion chambers 57, and 58, respectively, on the opposite sides of the shaft, are increased in size to maximum cubic capacity by the movement of the opposite end walls of the respective openings 51 and 52, away from their respective surfaces of the squared central operating shaft.

Thus the four expansion or compression spaces or chambers, 53, 54, 57, and 58, operate in pairs at opposite sides of the squared central operating shaft. Suitable inlet and outlet ports, 61, 62, respectively, are provided on each side of the casing to communicate successively with the chambers at their side of the casing. Extension ducts or channels 60 may be formed on one or both sides of either the inlet or outlet ports by cutting away a portion of the adjacent inner wall of the casing to control or "time" the intake and cut-off points. Adjustable means may be provided to vary the length of such extensions as desired. Conduits may be provided as required to connect said apparatus with other equipment as to any or all of said ports, and check valves may be provided in said conduits or in the casing adjacent the inner port openings to prevent back pressure or otherwise control the operation of the apparatus.

Two alternately operating distinct compression or expansion mechanisms are provided so far as the admission or discharge of fluid is concerned on each side of the apparatus, but obviously they have the same central operating shaft, the same cross guide member, the same oscillating member, the same casing, and the same guiding or driving means presently to be described. The two chambers on one side of the apparatus have the same slotted opening, in part, serving as the chamber forming means. This arrangement concentrates into a single compact unit the equivalent of a four cylinder pump or engine structure, and if desired, the opposite sides of the apparatus may function as either driving or driven means, and may independently receive distinct fluids.

The central operating shaft 41 may be a drive shaft or a power take-off shaft according to the use to which the apparatus is put, as a pump, gas engine, steam power unit, or other construction, or as a combination of several of these devices.

For whatever use the device is applied to the features of construction will be substantially the same, variation being made in the inlet and outlet ports, and the fluids admitted to the several chambers.

The oscillating member 47 is guided and moved from side to side as it rotates with the squared shaft 42 and the cross guide member 43, by means of pins 63, 64, set on opposite sides of the annular pin carrying member 65, which travels in the channel between the faces 11 and 12 of the flanges of the casing and the inner faces of the casing member 13. The pins are received in sockets 66, and 67, formed in opposite sides of the oscillating member in the plane of the openings 51, 52, and at a central point between said openings.

The size of the openings and the degree of oscillation may be varied in accordance with the service for which the apparatus is intended, and packing elements in the form of fiber inserts set in recesses surrounding the chambers and cut into the spherical surface of the oscillating member. The casing may be formed with water jacket chambers or have external fins for cooling purposes. Passageways 71 for oil may be provided as indicated in dotted lines through one or both ends of the shaft along its axial line with a cross passageway 72 communicating with an axial passageway 73 formed in the cross guide member. The ends of the cross guide member and the surface of the oscillating member adjacent thereto may be slightly relieved from contact with the inner surface of the casing to provide for the free egress of the oil film at such point.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:

1. A pump or motor apparatus of the character described, having in combination a housing providing a spherical chamber, a shaft extending through said housing, an impeller member of spherical form having a fluid handling chamber therein engaged about said shaft, and supported for oscillation relatively thereto to change the size of said fluid handling chamber, and means for positively guiding said member from side to side of said casing.

2. A pump or motor apparatus of the character described, having in combination a housing providing a spherical chamber, a shaft extending through said housing, an impeller member of spherical form having a fluid handling chamber therein engaged about said shaft and supported therein for oscillation relative thereto, and means for positively guiding said member from side to side of said casing to change the size of said fluid handling chamber, said means comprising a channel extending about said casing in an oblique direction and a pin movably supported in said channel and engaging the peripheral portion of said member.

3. An apparatus of the character described, having in combination a housing providing a spherical chamber, a shaft extending through said housing, an impeller member of spherical form having a fluid handling chamber therein engaged about said shaft and supported for oscillation relative thereto, means for positively guiding said member from side to side of said casing, said means comprising a channel extending about said casing in an oblique direction and a pin movably supported in said channel and engaging the peripheral portion of said member, and an inlet and an outlet port on each side of said housing adjacent the ends of said shaft to provide for fluid inlet and discharge from such chamber.

4. A pump or motor apparatus of the character described, having in combination a spherical casing, a shaft extending through said casing, a fixed cylindrical element centrally of said shaft, an impeller member of spherical form having a fluid handling chamber therein engaged over said element for movement laterally thereover, and means at the periphery of said member in slidable engagement with said casing for compressing fluid received within said casing.

5. A pump or motor apparatus of the character described, having in combination a casing, a pair of rotatable members supported in said casing, one of said members being engaged over and supported on the other member and rotatable therewith and having a fluid handling chamber therein and means on said casing for moving one of said members relatively to the other to change the size of said fluid handling chamber.

6. A pump or motor apparatus of the character described, having in combination a casing, a pair of rotatable members supported in said casing, one of said members being engaged over and supported on the other member and rotatable therewith and having a fluid handling chamber therein and means on said casing for oscillating one of said members relatively to the other to change the size of said fluid handling chamber.

7. A pump or motor apparatus of the character described, having in combination a casing, a pair of rotatable members supported in said casing and adapted in association with the walls of the casing to form a fluid receiving chamber, one of said members being engaged over and supported on the other member and rotatable therewith having a fluid handling chamber therein and means for moving at least one of said members relatively to the other to change the size of said chamber.

8. A pump or motor apparatus of the character described, having in combination a casing, a pair of rotatable members supported in said casing and adapted in association with the walls of the casing to form a fluid receiving chamber, one of said members being engaged over and supported on the other member and rotatable therewith and having a fluid handling chamber therein and means for moving at least one of said members relatively to the other to enlarge the size of said chamber.

9. A pump or motor apparatus of the character described, having in combination a casing, a pair of rotatable members supported in said casing and adapted in association with the walls of the casing to form a fluid receiving chamber, one of said members being engaged over and supported on the other member and rotatable therewith and having a fluid handling chamber therein and means for moving at least one of said members relatively to the other to reduce the size of said chamber.

10. A pump or motor apparatus of the character described, having in combination a casing, a pair of rotatable members supported in said casing one of said members being engaged over and supported on the other member and rotatable therewith and having fluid handling chambers therein and adapted in association with the walls of the casing to form a plurality of oppositely positioned receiving chambers at each side of said casing, and means for moving at least one of said members relatively to the other to change the size of said chambers.

11. A pump or motor apparatus of the character described, having in combination a casing, a pair of rotatable members supported in said casing one of said members being engaged over and supported on the other member and rotatable therewith and having fluid handling chambers therein and adapted in association with the walls of the casing to form a plurality of oppositely positioned receiving chambers at each side of said casing and means for moving at least one of said members relatively to the other to reduce the size of one of said pairs of chambers while increasing the size of its companion chamber on each of the respective sides of said apparatus.

12. An apparatus of the character described, having in combination a casing, a pair of rotatable members supported in said casing one of said members being engaged over and supported on the other member and rotatable therewith and having fluid handling chambers therein and adapted in association with the walls of the casing to form a plurality of oppositely positioned receiving chambers at each side of said casing, means for moving at least one of said members relatively to the other to reduce the size of one of said pairs of chambers while increasing the size of its companion chamber on each of the respective sides of said apparatus, and a passageway for fluid connected to each of said respective chambers.

13. A pump or motor apparatus of the character described, having in combination a casing, a shaft extending through said casing and having a squared cross section throughout its extent within the hollow interior portion of said casing, a pivot element engaged over such shaft, an oscillating element in the form of a spherical member engaged over said pivot element for oscillatory movement thereon and engaged with the sides of said squared shaft for rotation therewith to form fluid handling chambers, and means on said casing for oscillating said oscillating element.

14. A pump or motor apparatus of the character described, having in combination a casing having a spherical inner chamber, a shaft extending through said casing and having a squared cross section throughout its extent within the hollow interior portion of said casing, a pivot element engaged over such shaft, a substantially spherical oscillating element formed with an opening through one axis thereof and engaged over the entire squared portion of said shaft to form fluid handling chambers, and having a bearing aperture to receive said pivot element, and means on said casing for oscillating said oscillating element, comprising a sliding ring carrying a pair of guide pins, said guide pins engaging sockets within said oscillating element.

15. A pump or motor apparatus of the character described, having in combination a casing providing a spherical chamber within the same, a shaft rotatably supported therein having parallel side surfaces, a spherical member closely fitted within said chamber and engaging over said shaft and having recesses providing parallel surfaces closely spaced from the parallel surfaces of said shaft, and, in conjunction with the intermediate surfaces of said shaft and the inner casing wall, providing a plurality of expansible fluid handling chambers within said casing, and means to move said spherical member relative to said shaft to change the size of said fluid handling chambers.

16. An apparatus of the character described, having in combination a casing providing a spherical chamber within the same, a shaft rotatably supported therein having parallel side surfaces, a cylindrical member engaged centrally over said shaft at right angles thereto, a spherical member supported for oscillation on said cylindrical member and closely fitted within said chamber and engaging over said shaft and having recesses providing parallel surfaces closely spaced from the parallel surfaces of said shaft, and, in conjunction with the intermediate surfaces of said shaft and the inner casing wall, providing a plurality of expansible fluid handling chambers within said casing, means to move said spherical member relative to said shaft to change the size of said fluid handling chambers, and ports through said casing to provide communication with said chambers.

17. A pump or motor apparatus of the character described, having in combination a casing providing a spherical chamber within the same, a shaft rotatably supported therein having parallel side surfaces, a spherical member closely fitted within said chamber and engaging over said shaft and having recesses providing parallel surfaces closely spaced from the parallel surfaces of said shaft, and, in conjunction with the intermediate surfaces of said shaft and the inner casing wall, providing a plurality of expansible fluid handling chambers within said casing, and means to move said spherical member relative to said shaft, including an annular member obliquely supported for rotation within said casing and means pivotally connecting the same with said spherical member whereby change of size of said fluid handling chambers is brought about.

WILLIAM WEIS.